(12) United States Patent
Barbarin et al.

(10) Patent No.: US 11,548,320 B2
(45) Date of Patent: Jan. 10, 2023

(54) TREAD FOR A TIRE OF A HEAVY CIVIL ENGINEERING VEHICLE

(71) Applicant: COMPAGNIE GENERALE DES ETABLISSEMENTS MICHELIN, Clermont-Ferrand (FR)

(72) Inventors: François Barbarin, Clermont-Ferrand (FR); Guillaume Demaziere, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 812 days.

(21) Appl. No.: 15/780,927

(22) PCT Filed: Dec. 6, 2016

(86) PCT No.: PCT/FR2016/053222
§ 371 (c)(1),
(2) Date: Jun. 1, 2018

(87) PCT Pub. No.: WO2017/098132
PCT Pub. Date: Jun. 15, 2017

(65) Prior Publication Data
US 2018/0354310 A1  Dec. 13, 2018

(30) Foreign Application Priority Data
Dec. 7, 2015 (FR) ........................ 1561922

(51) Int. Cl.
*B60C 11/03* (2006.01)
*B60C 11/12* (2006.01)
*B60C 11/00* (2006.01)

(52) U.S. Cl.
CPC ........ *B60C 11/0306* (2013.01); *B60C 11/033* (2013.01); *B60C 11/12* (2013.01);
(Continued)

(58) Field of Classification Search
CPC ........... B60C 2200/065; B60C 11/0306; B60C 11/033; B60C 11/12; B60C 11/1236;
(Continued)

(56) References Cited

U.S. PATENT DOCUMENTS

| 3,511,290 A | * | 5/1970 | Kutsmichel ............. B60C 11/12 |
|---|---|---|---|
| | | | 152/209.16 |
| 6,408,910 B1 | | 6/2002 | Langier |
| 2009/0229721 A1 | | 9/2009 | Ikeda |
| 2011/0114863 A1 | | 5/2011 | Nelson |

(Continued)

FOREIGN PATENT DOCUMENTS

| EP | 0 367 557 | | 5/1990 | |
|---|---|---|---|---|
| EP | 0611667 A1 | * | 8/1994 | ......... B60C 11/0304 |

(Continued)

*Primary Examiner* — Katelyn W Smith
*Assistant Examiner* — Philip N Schwartz
(74) *Attorney, Agent, or Firm* — Cozen O'Connor

(57) ABSTRACT

Tire (1) for a heavy-duty vehicle of civil engineering type, and more particularly to the tread (2) thereof, and seeks to improve the grip thereof, while at the same time ensuring a satisfactory compromise with wearing and thermal endurance. The tread (2) comprises cuts (3, 4, 5) distributed, in a circumferential direction (XX') of the tire, among circumferential grooves (3) and, in an axial direction (YY') of the tire, transverse sipes (4) and transverse grooves (5), the cuts (3, 4, 5) delimiting elements in relief (6), each cut (3, 4, 5) being delimited by two faces facing one another and each face intersecting the tread surface (21) along an edge corner (311, 321; 411, 421; 511, 521). The tread (2) having a longitudinal edge corners ratio $TA_X$ equal to the ratio $L_X/S$ between the sum $L_X$ of the projections, on to the circumferential direction (XX'), of the effective edge corner lengths, contained in an elementary tread surface portion of surface area S, and the surface area S, and a transverse edge corners ratio $TA_Y$ equal to the ratio $L_Y/S$ between the sum $L_Y$ of the projections, onto the axial direction (YY'), of the effective edge corner lengths, contained in an elementary tread sur- (Continued)

face portion of surface area S, and the surface area S, the longitudinal edge corners ratio $TA_X$ is at least equal to 4 m$^{-1}$ and the transverse edge corners ratio $TA_Y$ is at least equal to 6 m$^{-1}$.

19 Claims, 4 Drawing Sheets

(52) U.S. Cl.
CPC ...... *B60C 11/1236* (2013.01); *B60C 11/1259* (2013.01); *B60C 2011/0033* (2013.01); *B60C 2011/0353* (2013.01); *B60C 2011/0355* (2013.01); *B60C 2011/129* (2013.01); *B60C 2200/065* (2013.01)

(58) Field of Classification Search
CPC ........... B60C 11/1259; B60C 2011/129; B60C 2011/0033; B60C 2011/0353; B60C 2011/0355; B60C 11/1218
See application file for complete search history.

(56) References Cited

U.S. PATENT DOCUMENTS

| 2012/0325385 | A1 | 12/2012 | Ochi | |
|---|---|---|---|---|
| 2013/0098519 | A1 | 4/2013 | Maehara | |
| 2014/0299242 | A1* | 10/2014 | Chauvin | ............. B60C 11/0306 |
| | | | | 152/209.8 |
| 2017/0001478 | A1 | 1/2017 | Rolland | |
| 2017/0087940 | A1* | 3/2017 | Hasegawa | ........... B60C 11/0311 |
| 2018/0201070 | A1* | 7/2018 | Hasegawa | ............... B60C 11/03 |

FOREIGN PATENT DOCUMENTS

| EP | 2 100 753 | 9/2009 |
|---|---|---|
| EP | 2 308 695 | 4/2011 |
| EP | 2 546 076 | 1/2013 |
| EP | 2 583 839 | 4/2013 |
| FR | 2 763 892 | 12/1998 |
| JP | 2011 000991 | 1/2011 |
| JP | 2014 125109 | 7/2014 |
| WO | WO 2013/014253 | 1/2013 |
| WO | WO 2015/114129 | 8/2015 |

\* cited by examiner

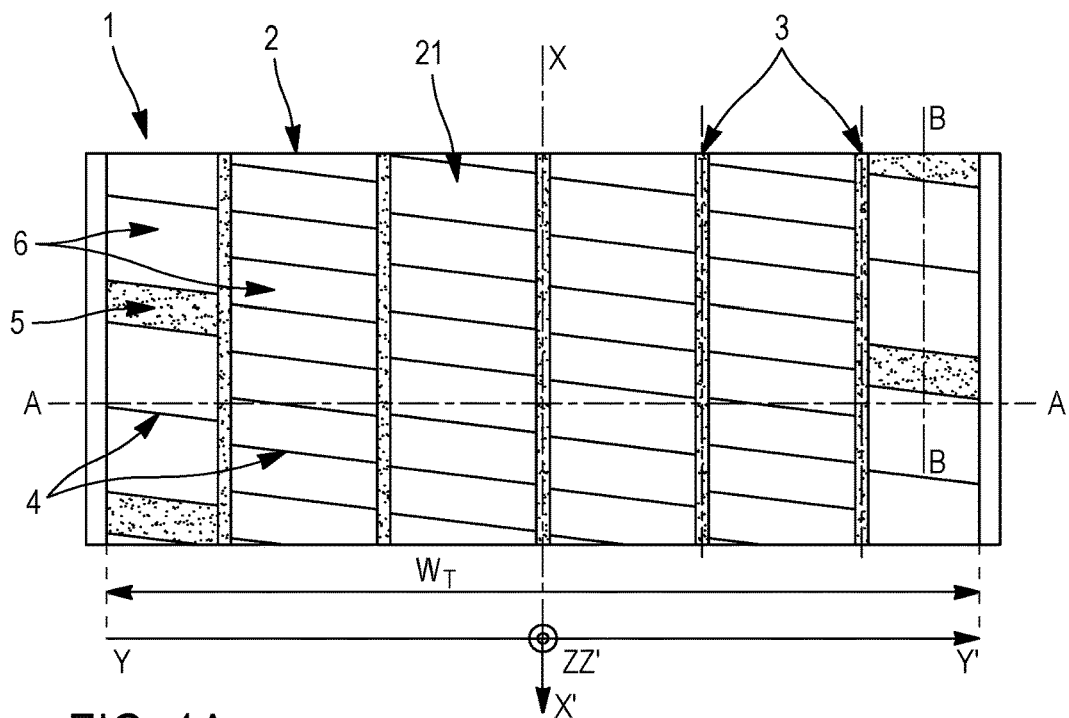
FIG. 1A
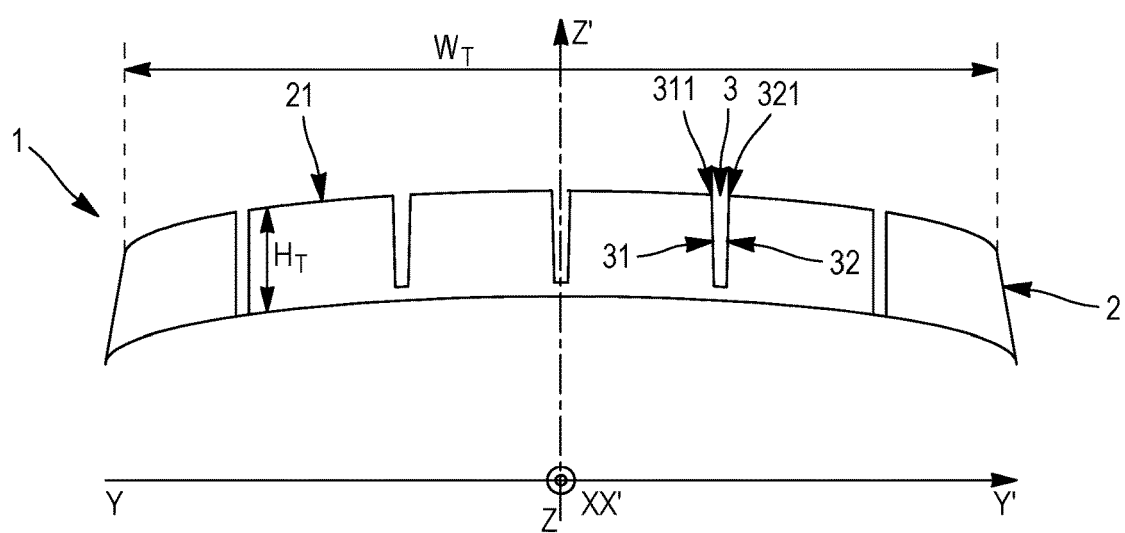
FIG. 1B (A-A)
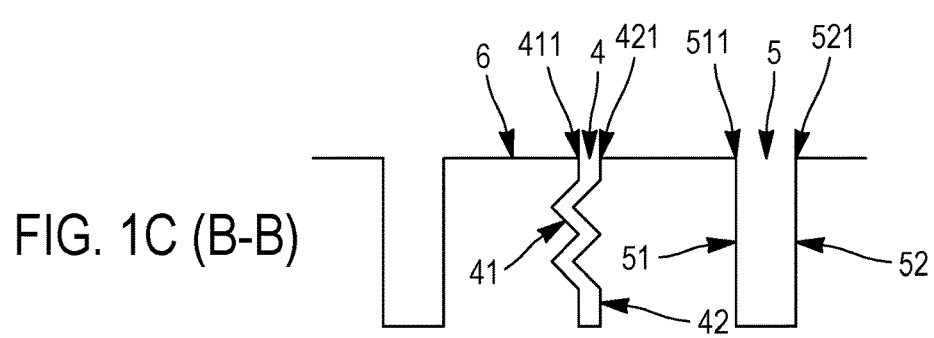
FIG. 1C (B-B)

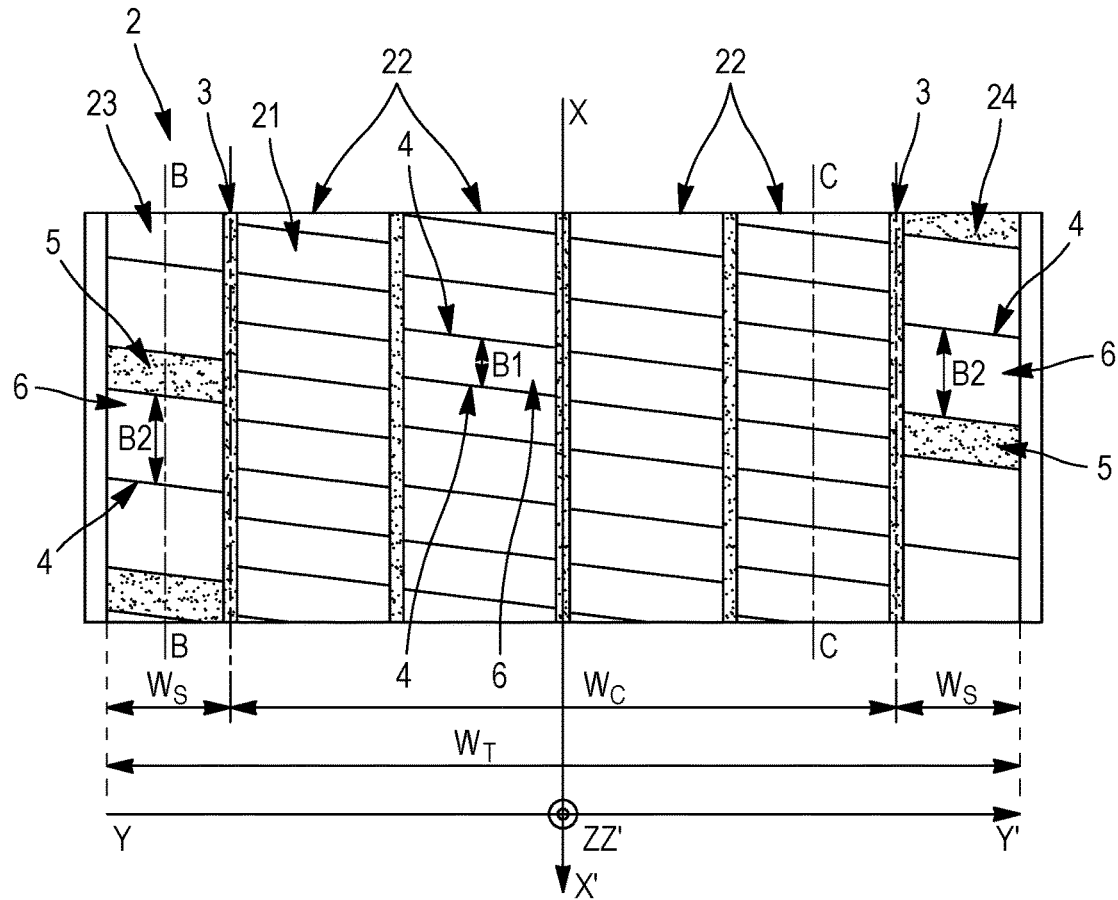
FIG. 3A
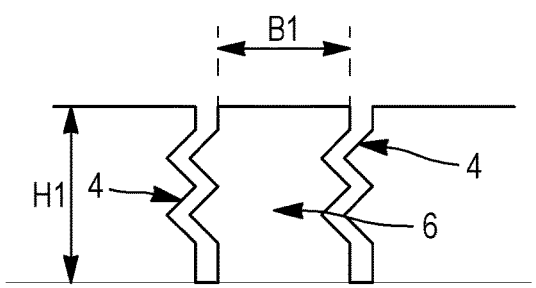
FIG. 3B (C-C)
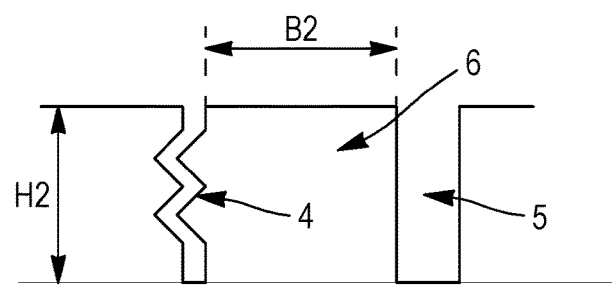
FIG. 3C (B-B)

TREAD FOR A TIRE OF A HEAVY CIVIL ENGINEERING VEHICLE

RELATED APPLICATIONS

This is a U.S. National Phase Application under 35 USC 371 of International Application PCT/FR2016/053222 filed on Dec. 6, 2016.

This application claims the priority of French application no. 1561922 filed Dec. 7, 2015, the entire content of which is hereby incorporated by reference.

FIELD OF THE INVENTION

The present invention is related to a tire for a heavy-duty vehicle of civil engineering type, intended to carry heavy loads and to run over uneven ground such as that of mines. This invention relates more particularly to the tread of such a tire.

BACKGROUND OF THE INVENTION

In this document:
- a radial direction means a direction perpendicular to the axis of rotation of the tire, corresponding to the direction of the thickness of the tread.
- an axial or transverse direction means a direction parallel to the axis of rotation of the tire.
- a circumferential or longitudinal direction means a direction tangential to the circumference of the tire, perpendicular both to the axial direction and to a radial direction.
- an equatorial plane is a plane perpendicular to the axis of rotation of the tire and dividing the tread widthwise into two halves of equal widths.

The tread is that part of the tire that comprises at least one elastomeric material and is intended to come into contact with the ground via a tread surface and to be worn away.

In order to ensure satisfactory performance in terms of longitudinal grip, in traction and braking, and transverse grip, it is necessary to form within the tread a more or less complex system of cuts separating elements in relief, referred to as a tread pattern.

In the present document, a cut generically denotes either a groove or a sipe and corresponds to the space delimited by walls of material that face one another and are at a distance from one another which distance is referred to as the "width of the cut". It is precisely this difference that differentiates a sipe from a groove. In the case of a sipe, this distance is suited to allowing the opposing walls delimiting the said sipe to come into at least partial contact with one another at least in the contact patch in which the tread is in contact with the ground, when the tire is subjected to nominal recommended loading and pressure conditions. In the case of a groove, the walls of this groove cannot come into contact with one another under normal running conditions.

By definition, an element in relief formed in the tread extending in the circumferential direction over the entire circumference of the tire is referred to as a rib. A rib comprises two lateral walls and a contact face, the contact face being part of the tread surface intended to come into contact with the ground during running. A rib is delimited by two circumferential cuts or circumferential grooves, unless the said rib is an axially exterior portion of the tread delimited, in this case, on just one side by a circumferential groove.

The tread thus generally comprises cuts distributed among circumferential (or longitudinal) grooves, transverse (or axial) grooves, and transverse (or axial) sipes. What is meant by a circumferential groove is a groove the mean profile of which forms, with the circumferential direction, an angle at most equal to 45°: this is a groove the mean profile of which has an a circumferential overall direction, which means to say of which the mean inclination is closer to the circumferential than axial direction. What is meant by a transverse groove or sipe is a cut the mean profile of which forms, with the circumferential direction, an angle at least equal to 45°: this is a cut the mean profile of which has an axial overall direction, which means to say of which the mean inclination is closer to the axial than circumferential direction. Thus a transverse cut may be strictly transverse, which means to say that its mean profile forms, with the circumferential direction, an angle equal to 90°, or substantially oblique, which means to say that its mean profile forms, with the circumferential direction, an angle strictly smaller than 90°.

The tread is generally geometrically characterized by an axial width $W_T$ and a radial thickness $H_T$. The axial width $W_T$ is defined as being the axial width of the contact surface of the tread of the new tire with smooth ground, the tire being subjected to pressure and load conditions as recommended, for example, by the E.T.R.T.O (European Tire and Rim Technical Organization) standard. The radial thickness $H_T$ is defined, by convention, as being the maximum radial depth measured in the cuts, usually in the circumferential grooves. In the case of a tire for a heavy-duty vehicle of civil engineering type, and by way of example, the axial width $W_T$ is at least equal to 600 mm and the radial thickness $H_T$ is at least equal to 70 mm.

Usually, the tread comprises at least two circumferential grooves positioned axially one on each side of the equatorial plane. Each circumferential groove extends axially between two substantially circumferential faces, radially toward the inside from the tread surface as far as a bottom face and circumferentially around the entire circumference of the tire. Each circumferential groove positioned axially, with respect to the equatorial plane, at an axial distance L, has a radial depth H, the mean value over the entire periphery of the tire, measured between the tread surface and the bottom face, the radial depth H being at least equal to 70% of the radial thickness $H_T$ and at most equal to the radial thickness $H_T$. Each circumferential groove also has an axial width W, the mean value over the radial depth H of the distance measured between the two substantially circumferential faces of the circumferential groove.

The tread may be divided into a middle portion having an axial width We at least equal to 50% and at most equal to 80% of the total width $W_T$, generally although not necessarily delimited axially by the two axially outermost circumferential grooves, and two lateral portions positioned respectively one on each side of the middle portion and each having an axial width $W_S$ at least equal to 10% and at most equal to 25% of the total width $W_T$. Specifically, the middle portion and the lateral portions are subjected to significantly different mechanical loadings and this may entail different design choices from one portion to another, notably given the fact of a great deal of variation in the load applied to the tire during use, according to whether the vehicle is laden or empty.

The usual running conditions, in terms of pressure, load and speed, for a tire for a heavy-duty vehicle of the civil engineering type such as, for a dumper intended to transport materials extracted from quarries or opencast mines, are particularly harsh. By way of example, on sites at which materials, such as ores or coal, are extracted, the use of a vehicle of dumper type consists, in simplified form, of an alternation of laden outbound cycles and of unladen return cycles. In a laden outbound cycle, the laden vehicle transports the extracted materials, mainly uphill, from the loading zones at the bottom of the mine, or the bottom of the pit, to unloading zones, thereby requiring that the tires have good grip in traction. In an unladen return cycle, the empty vehicle returns, mainly downhill, towards the loading zones at the bottom of the mine, thereby requiring good tire grip under braking. The often sloping tracks are also often winding, which requires that the tires have good transverse grip. Furthermore, the tracks on which the vehicles run are made up of materials generally taken from the mine, for example compacted crushed rocks which are regularly damped down in order to guarantee the integrity of the wearing layer of the track as the vehicles pass over it and which are often covered with mud and water: thereby requiring this mixture of mud and water to be removed by the tread in order to guarantee satisfactory grip on muddy ground.

It is known that the grip of a tire is dependent in particular on the number of cuts in the tread, and, more particularly, on the cumulative length of the effective edge corners of these cuts in the contact patch in which the tread is in contact with the ground. Any cut comprises two edge corners, an edge corner being the intersection of a face of the cut with the tread surface. What is meant by an effective edge corner is an edge corner which has a significant indentation effect with respect to the ground. By way of example, regarding the transverse cuts, only one edge corner is truly effective with respect to longitudinal grip: the edge corner referred to as the leading edge corner, which is first to enter the contact patch is effective in terms of longitudinal grip in traction, and the edge corner referred to as the trailing edge corner, which is last to enter the contact patch, is effective with respect to longitudinal grip under braking. Thus, half of the edge corners are effective depending on the type of loading of the tread, for example longitudinally, under the effect of driving or braking torque, or transversely. Therefore the cumulative length of the effective edge corners is equal to half the cumulative length of all the edge corners or to the cumulative length of the neutral axes of the cuts.

Thus there are two types of tread feature that are often used: the overall volume voids ratio $TE_G$, longitudinal volume voids ratio $TE_X$ and transverse volume voids ratio $TE_Y$ and the longitudinal edge corners ratio $TA_X$ and transverse edge corners ratio $TA_Y$.

By definition, the overall volume voids ratio $TE_G$ of the tread is equal to the ratio between the total volume $V_D$ of the cuts, measured on the unconstrained tire, namely on the tire when it is not mounted and not inflated, and the sum of the total volume $V_D$ of the cuts and of the total volume $Y_R$ of the elements in relief delimited by these cuts. The sum $V_D+V_R$ corresponds to the volume comprised radially between the tread surface and a bottom surface, translated from the tread surface radially inwards by a radial distance equal to the radial thickness $H_T$ of the tread. This overall volume voids ratio $TE_G$, expressed as a %, governs the wearing performance in terms of the volume of wearable rubber available, and the longitudinal and transverse grip performance, through the presence of respectively transverse and longitudinal edge corners and of cuts capable of storing or removing water or mad.

The overall volume voids ratio $TE_G$ can be broken down into the sum of a longitudinal volume voids ratio $TE_X$ and of a transverse volume voids ratio $TE_Y$. The longitudinal volume voids ratio $TE_X$ is equal to the ratio between the total volume $Y_{DX}$ of the longitudinal cuts, of circumferential groove type, and the sum of the total volume $Y_D$ of the cuts and of the total volume $Y_R$ of the elements in relief delimited by these cuts: it governs the performance in terms of wear, the thermal performance and the performance in terms of transverse grip. The transverse volume voids ratio $TE_Y$ is equal to the ratio between the total volume $Y_{DY}$ of the transverse cuts, of sipe and groove type, and the sum of the total volume $Y_D$ of the cuts and of the total volume $Y_R$ of the elements in relief delimited by these cuts: it governs the performance in terms of wear, the thermal performance and the performance in terms of longitudinal grip.

A volume voids ratio may also be determined for a portion of the tread in order to evaluate the contribution made by this portion to the performance in terms of wear and in terms of grip. It is thus possible to define, for the middle portion of the tread, a middle volume voids ratio $TE_C$, equal to the ratio between the total volume $Y_{DC}$ of the cuts in the middle portion and the sum of the total volume $Y_{DC}$ of the cuts in the middle portion and of the total volume $Y_{RC}$ of the elements in relief of the middle portion which are delimited by these cuts. The sum $V_{DC}+V_{RC}$ corresponds to the volume of the middle portion comprised radially between the tread surface and a bottom surface, translated from the tread surface radially inwards by a radial distance equal to the radial thickness $H_T$ of the tread. Similarly, it is possible to define, for each lateral portion, a lateral volume voids ratio $TE_S$, equal to the ratio between the total volume $Y_{DS}$ of the cuts in the lateral portion and the sum of the total volume $Y_{DS}$ of the cuts in the lateral portion and of the total volume $Y_{RS}$ of the elements in relief of the lateral portion which are delimited by these cuts. The sum $V_{DS}+V_{RS}$ corresponds to the volume of the lateral portion comprised radially between the tread surface and a bottom surface, translated from the tread surface radially inwards by a radial distance equal to the radial thickness $H_T$ of the tread. It should be noted that the volume of a circumferential groove delimiting the middle portion and a lateral portion is taken into consideration, half of it in the calculation of the middle volume voids ratio $TE_C$ and half in the calculation of the lateral volume voids ratio $TE_S$.

Regarding the edge corners ratio, the longitudinal edge corners ratio $TA_X$ is the ratio $L_X/S$ between the sum $L_X$ of the projections, onto the circumferential direction XX', of the effective edge corner lengths, contained in an uncut elementary tread surface portion of surface area S, and the surface area S. The longitudinal edge corners ratio $TA_X$ does not take account of the edge corners of the axial ends of the tread. The elementary tread surface portion conventionally corresponds to an elementary pattern of which the repeat in the circumferential direction constitutes the tread surface. The longitudinal edge corners ratio $TA_X$, expressed in m⁻, governs the transverse grip which is better the higher the longitudinal edge corners ratio $TA_X$. Similarly, the transverse edge corners ratio $TA_Y$ is the ratio $L_Y/S$, between the sum $L_Y$ of the projections, onto the axial direction YY', of the effective edge corner lengths, contained in a tread surface portion of surface area S, and the surface area S. The transverse edge corners ratio $TA_Y$, expressed in m$^{-1}$, governs the longitudinal grip in braking and in traction, which is better the higher the transverse edge corners ratio $TA_Y$.

SUMMARY OF THE INVENTION

One object of the present invention is to provide a tread for a tire of a heavy-duty vehicle of civil engineering type that makes it possible to improve the longitudinal grip both in terms of traction and in terms of braking, and the transverse grip during use on tracks which may be covered with water and with mud, while ensuring a satisfactory compromise with wearing performance and performance in terms of thermal endurance.

This object has been achieved in accordance with one aspect of the invention directed to a tire for a heavy-duty vehicle of civil engineering type comprising a tread, intended to come into contact with the ground via a tread surface:

the tread having an axial width $W_T$ and a radial thickness $H_T$ at least equal to 70 mm, the tread comprising cuts distributed, in a circumferential direction of the tire, among circumferential grooves and, in an axial direction of the tire, transverse sipes and transverse grooves, the cuts delimiting elements in relief, each cut being delimited by two faces facing one another and each face intersecting the tread surface along an edge corner, the tread having a longitudinal edge corners ratio $TA_X$ and a transverse edge corners ratio $TA_Y$, the longitudinal edge corners ratio $TA_X$ being equal to the ratio $L_X/S$ between the sum $L_X$ of the projections, onto the circumferential direction, of the effective edge corner lengths, contained in an elementary tread surface portion of surface area S, and the surface area S, the transverse edge corners ratio $TA_Y$ being equal to the ratio $L_Y/S$ between the sum $L_Y$ of the projections, onto the axial direction, of the effective edge corner lengths, contained in an elementary tread surface portion of surface area S, and the surface area S, the longitudinal edge corners ratio $TA_X$ being at least equal to 4 $m^{-1}$ and the transverse edge corners ratio $TA_Y$ being at least equal to 6 $m^{-1}$.

In other words, according to an embodiment of the invention, a tread surface portion of 1 $m^2$ comprises a cumulative 4 m of length of effective edge corners in the circumferential direction, and a cumulative 6 m of length of effective edge corners in the axial direction. The combination of such respectively longitudinal $TA_X$, and transverse $TA_Y$, edge corners ratios guarantees good transverse and longitudinal grip on wet ground or ground covered with a liquid mud or a mixture of snow and ice.

Advantageously, the transverse edge corners ratio $TA_Y$ is at least equal to 8 $m^{-1}$, preferably at least equal to 10 $m^{-1}$.

More advantageously still, the sum of the longitudinal edge corners ratio $TA_X$ and of the transverse edge corners ratio $TA_Y$ is at least equal to 12 $m^{-1}$, preferably at least equal to 14 $m^{-1}$.

Advantageously, the overall volume voids ratio $TE_G$ is at least equal to 8% and at most equal to 17%, preferably at most equal to 15%, the longitudinal volume voids ratio $TE_X$ is at least equal to 0.25 times and at most equal to 0.50 times the overall volume voids ratio $TE_G$ and the transverse volume voids ratio $TE_Y$ is at least equal to 0.50 times and at most equal to 0.75 times the overall volume voids ratio $TE_G$.

The overall volume voids ratio $TE_G$ needs to have a minimal value in order to ensure the presence of a minimum of edge corners and of voids with respect to grip, and needs to have a maximum value to ensure sufficient transverse and longitudinal tread stiffnesses for transmitting transverse and longitudinal loads to the ground and for ensuring a sufficient volume of wearable material. The inventors have also shown that the overall volume voids ratio $TE_G$ needs advantageously to be broken down into a longitudinal volume voids ratio $TE_X$, in the circumferential direction XX', representing between one quarter and one half of the overall volume voids ratio $TE_G$, and a transverse volume voids ratio $TE_Y$, in the axial direction YY', representing between one half and three quarters of the overall volume voids ratio $TE_G$.

The tread comprises a middle part having an axial width $W_C$ at least equal to 50% and at most equal to 80% of the total width $W_T$, and two lateral portions, positioned axially on either side of the middle part respectively, and each having an axial width $W_S$ at least equal to 10% and at most equal to 25% of the total width $W_T$. The middle portion and each lateral portion have a middle volume voids ratio $TE_C$ and a lateral volume voids ratio $TE_S$, respectively. The middle volume voids ratio $TE_C$ is equal to the ratio between the total volume $V_{DC}$ of the cuts in the middle portion and the sum of the total volume $V_{DC}$ of the cuts in the middle portion and of the total volume $V_{DC}$ of the elements in relief of the middle portion which are delimited by these cuts. The lateral volume voids ratio $TE_S$ is equal to the ratio between the total volume $V_{DC}$ of the cuts in the lateral portion and the sum of the total volume $V_{DS}$ of the cuts in the lateral portion and of the total volume $V_{RS}$ of the elements in relief of the lateral portion which are delimited by these cuts. It should be noted that the volume of a circumferential groove delimiting the middle portion and a lateral portion is taken into consideration, half of it in the calculation of the middle volume voids ratio $TE_C$ and half in the calculation of the lateral volume voids ratio $TE_S$. More advantageously still, the middle volume voids ratio $TE_C$ is at least equal to 8% and at most equal to 13% and the lateral volume voids ratio $TE_S$ is at least equal to 19% and at most equal to 25%.

These features describe in particular the fact that the volume of the cuts is higher in the lateral parts than in the middle part. This makes it possible to encourage the removal of mud by the lateral parts, thus promoting grip on muddy ground. This also ensures that a maximum amount of material is present in the centre, which is good for resistance to wear.

According to a first preferred embodiment, the tread comprising at least two circumferential grooves, positioned axially one on each side of an equatorial plane passing through the middle of the tread and perpendicular to the axis of rotation of the tire, each circumferential groove extending axially between two substantially circumferential faces, radially towards the inside from the tread surface as far as a bottom face and circumferentially around the entire circumference of the tire, each circumferential groove being axially positioned with respect to the equatorial plane at an axial distance L, having an axial width W, measured between the two substantially circumferential faces, and a radial depth H, measured between the tread surface and the bottom face, the radial depth H being at least equal to 70% of the radial thickness $H_T$ and at most equal to the radial thickness $H_T$, each circumferential groove has an axial width W and a radial depth H, such that the ratio W/H is at least equal to 0.06, the axial distance C between two consecutive circumferential grooves is at least equal to 12% and at most equal to 21% of the axial width $W_T$ of the tread, and each of the axially outermost circumferential grooves is positioned axially, with respect to the equatorial plane, at an axial distance $L_E$ at least equal to 25% of the axial width $W_T$ of the tread.

The first feature, whereby each circumferential groove has an axial width W and a radial depth H, such that the ratio W/H is at least equal to 0.06, describes the fact that each circumferential groove must be wide enough to have a significant action on the cooling of the crown portion in vertical alignment with the circumferential groove. The axial width W is the mean value of the distances between the substantially circumferential faces of the circumferential groove, calculated over the radial depth H of the circumferential groove. The radial depth H is the mean value of the distances between the bottom face of the circumferential groove and the tread surface, calculated over the entire circumference of the tire. The volume of material above the hotspot is thus minimized and the volume of the groove ensures effective ventilation and better exchanges of heat between the crown of the tire and the external air.

The second feature, whereby the axial distance C between two consecutive circumferential grooves is at least equal to 12% and at most equal to 21% of the axial width $W_T$ of the tread, means that there needs to be a sufficient number of circumferential grooves to ensure cooling of the crown, but that, in order not to penalize the volume of wearable material, this number needs not to be too high. The axial distance C between two consecutive circumferential grooves, also referred to as the axial spacing of the circumferential grooves, is measured between the respective mean surfaces of the circumferential grooves.

Finally, the third feature whereby each of the axially outermost circumferential grooves is positioned axially, with respect to the equatorial plane, at an axial distance $L_E$ at least equal to 25% of the axial width $W_T$ of the tread, implies that the axially outermost circumferential grooves are axially positioned substantially in alignment with the ends of the working layers. This is because these zones are particularly sensitive hotspots from which cracks liable to lead to mechanical failure of the crown may originate.

In summary, this embodiment has a sufficient number of circumferential grooves which are sufficiently wide and axially positioned in vertical alignment with the hotspots of the crown that they can reduce the temperatures at these hotspots.

Advantageously, in this first embodiment, the ratio W/H is at most equal to 0.15. This maximum value for the ratio W/H guarantees a sufficient volume of wearable material. In addition, it still allows the circumferential groove to close as it enters the contact patch, thereby guaranteeing a tread that is compact and rigid enough to absorb the transverse loadings applied to the tire.

Advantageously too, in this first embodiment, the axial distance $L_E$ is at least equal to 30%, preferably at least equal to 35%, of the axial width $W_T$ of the tread. This minimum distance guarantees that the axially outermost circumferential grooves are axially positioned in alignment with the ends of the working layers, which are hotspots of the crown of the tire.

It is also advantageous, in this first embodiment, for the axial distance $L_E$ to be at most equal to 40% of the axial width $W_T$ of the tread. This maximum distance guarantees that there will be a lateral tread portion that is wide enough and therefore sufficiently resistant to chunking.

Finally, in this first embodiment, the axial distance C between two consecutive circumferential grooves is advantageously at least equal to 150% and at most equal to 200% of the radial thickness $H_T$. This feature describes the fact that the number of circumferential grooves is also dependent on the depth of the said circumferential grooves. Thus, the number of grooves needs to be high enough to ensure cooling but, in order to have sufficient rigidity of the elements in relief delimited by two consecutive circumferential grooves, needs not to be too high.

According to one advantageous alternative form of embodiment of the invention, the tread advantageously comprises at least four circumferential grooves, preferably at least five circumferential grooves. This minimum number of circumferential grooves provides a satisfactory compromise between effective cooling and sufficient volume of wearable material.

According to another advantageous alternative form of embodiment of the invention, the tread more advantageously still comprises at most eight circumferential grooves. Upwards of eight circumferential grooves, the tread contains too many cuts, and is therefore mechanically weaker and inadequate in terms of the volume of wearable material.

According to a second preferred embodiment, the tread comprising a middle portion having an axial width $W_C$ at least equal to 50% and at most equal to 80% of the axial width $W_T$ and two lateral respectively portions positioned axially on each side of the middle portion and each having an axial width $W_S$ at least equal to 10% and at most equal to 25% of the axial width $W_T$, the tread being such that the middle portion comprises transverse sipes opening into the circumferential grooves, these transverse sipes having a radial depth H1 at least equal to 70% of the radial thickness $H_T$ and delimiting elements in relief of a height equal to the radial depth H1 of the said transverse sipes and of circumferential length B1 equal to the mean distance between two consecutive transverse sipes, for all the elements in relief delimited by two consecutive transverse sipes of the middle portion, the ratio H1/B1 is at least equal to 0.5 and at most equal to 2.5.

By convention, the middle portion has an axial width $W_C$ at least equal to 50% and at most equal to 80% of the axial width $W_T$ and is generally, although not necessarily, delimited axially by the two axially outermost circumferential grooves. The circumferential ribs of the said middle portion are thus siped over the entire circumference of the tire. Two consecutive sipes delimit an element in relief having a radial height H1, corresponding to the radial depth H1 of the sipes, and a circumferential length B1, corresponding to the circumferential distance or circumferential spacing between two consecutive sipes.

The location of these sipes in the middle portion of the tread is justified by the fact that this middle portion bears almost all of the load applied to the tire when the vehicle on which it is fitted is running unladen. This principle of siping the middle portion thus makes it possible to reduce tire wear, particularly during the phases in which the vehicle is running unladen. Furthermore, the edge corners of these transverse sipes, namely the intersection between the faces of the sipes and the tread surface, contribute to a better longitudinal grip of the tire, both in terms of traction and under braking.

According to a third preferred embodiment, the tread comprising a middle portion having an axial width $W_C$ at least equal to 50% and most equal to 80% of the axial width $W_T$ and two lateral portions respectively positioned axially on each side of the middle portion and each having an axial width $W_S$ at least equal to 10% and at most equal to 25% of the axial width $W_T$, the tread being such that at least a lateral portion comprises transverse cuts, of transverse sipe and transverse groove type, opening on one side into a circumferential groove and on the other side into an axial end of the tread, these transverse cuts having a radial depth H2 at least equal to 70% of the radial thickness $H_T$ and delimiting elements in relief of a height equal to the radial depth H2 of the said transverse cuts and of circumferential length B2 equal to the mean distance between two consecutive transverse cuts, for all the elements in relief delimited by two consecutive transverse cuts of at least one lateral portion, the ratio H2/B2 is at least equal to 0.5 and at most equal to 2.5.

In this third preferred embodiment, the principle whereby the transverse cuts have a spacing comprised within a given range is applied to at least one lateral portion, usually to both the lateral portions of the tread, which are positioned axially one on each side of the middle portion. Each lateral portion has an axial width $W_S$ at least equal to 10% and at most equal to 25% of the axial width $W_T$, this axial width $W_S$ not necessarily being the same for each of the lateral portions. Indeed, the lateral portions contribute, with the middle portion, to the bearing of the load when the vehicle is running laden. By virtue of the transverse cuts of transverse sipe type, this alternative form therefore makes it possible to reduce the wearing of the lateral parts of the tread during phases in which the vehicle is running laden. Furthermore, the edge corners of these transverse sipes, namely the intersection between the faces of the sipes and the tread surface, contribute to a better longitudinal grip of the tire, both in terms of traction and under braking. By virtue of the transverse cuts of transverse groove type, this alternative form makes it possible to reduce the temperature of the lateral parts of the tread, and therefore improve the thermal endurance of the crown, during phases in which the vehicle is running laden.

According to an alternative form of the third preferred embodiment, at least one lateral portion comprises an alternation of transverse sipes and of transverse grooves such that any element in relief is delimited by a transverse sipe and a transverse groove which are consecutive. For preference, each lateral portion comprises an alternation of transverse sipes and of transverse grooves.

BRIEF DESCRIPTION OF THE DRAWINGS

The features of the invention are illustrated by the schematic drawings which are not drawn to scale.

FIG. 1A: a view from above of a tread of a tire according to an embodiment of the invention;

FIG. 1B: a view in meridian section, on a meridian plane AA, of a tread of a tire according to an embodiment of the invention.

FIG. 1C: a view in circumferential section, on a circumferential plane BB, of a tread of a tire according to an embodiment of the invention;

FIG. 3A: a plan view of a tread of a tire according to a preferred embodiment of the transverse cuts;

FIG. 3B: a view in circumferential section, on a circumferential plane AA, of a middle part of a tread of a tire according to one preferred embodiment of the transverse cuts;

FIG. 3C: a view in circumferential section, on a circumferential plane BB, of a lateral part of a tread of a tire according to one preferred embodiment of the transverse cuts;

DETAILED DESCRIPTION OF THE DRAWINGS

Figure 2A:
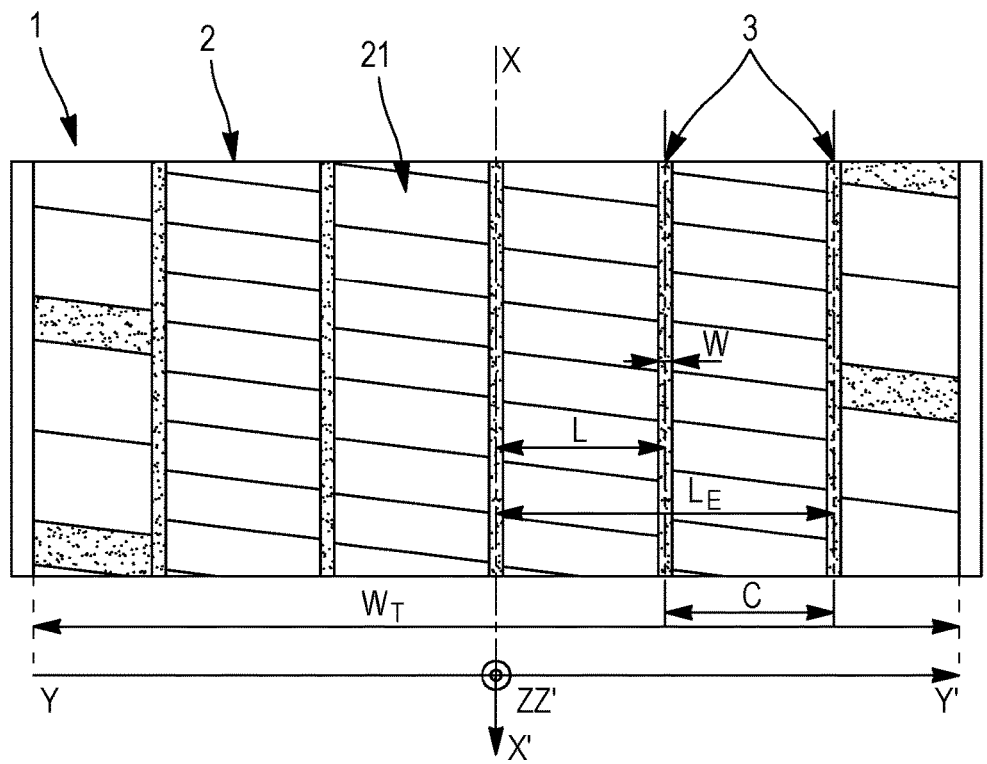
FIG. 2A: a plan view of a tread of a tire according to a preferred embodiment of the circumferential grooves.

FIG. 1A is a plan view of a tread 2 of a tire 1 according to the invention. The tread 2, intended to come into contact with the ground via a tread surface 21, has an axial width $W_T$ and a radial thickness $H_T$ (not depicted) at least equal to 70 mm. The tread 2 comprises cuts (3, 4, 5) distributed, in a circumferential direction XX' of the tire, as 5 circumferential grooves 3, in the scenario depicted, and, in an axial direction YY' of the tire, as transverse sipes 4 and transverse grooves 5. The cuts (3, 4, 5) delimit elements in relief 6. The tread 2 has a longitudinal edge corners ratio $TA_X$ equal to the ratio $L_X/S$ between the sum $L_X$ of the projections, onto the circumferential direction XX', of the effective edge corner lengths, contained in an elementary tread surface portion of surface area S, and the surface area S, and a transverse edge corners ratio $TA_Y$ equal to the ratio $L_Y/S$ between the sum $L_Y$ of the projections, onto the axial direction YY', of the effective edge corner lengths, contained in an elementary tread surface portion of surface area S, and the surface area S. It is usually conceded that, for a given cut comprising two edge corners, only one edge corner is effective under the envisaged stress loading. Thus, half the number of edge corners is taken into consideration when determining the sum of the effective edge corner lengths, in projection onto the circumferential direction XX' or onto the axial direction YY'. According to the invention, the longitudinal edge corners ratio $TA_X$ is at least equal to 4 m$^{-1}$ and the transverse edge corners ratio $TA_Y$ is at least equal to 6 m$^{-1}$.

FIG. 1B is a view in meridian section, on a meridian plane AA, of a tread 2 of a tire 1 according to the invention, having an axial width $W_T$ and a radial thickness $H_T$. It depicts in particular the meridian profiles of the cuts of circumferential groove type 3. Each circumferential groove 3 is delimited by two faces (31, 32) facing one another. Each face (31, 32) intersects the tread surface (21) along an edge corner (311, 321).

FIG. 1C is a view in circumferential section, on a circumferential plane BB, of a tread 2 of a tire 1 according to the invention. It depicts in particular, in circumferential section, the circumferential profiles of the transverse cuts of transverse sipe type 4 and transverse groove type 5. Each transverse sipe 4 is delimited by two faces (41, 42) facing one another, each face (41, 42) intersecting the tread surface (21) along an edge corner (411, 421). In the case presented, the transverse sipes 4 have a complex profile of wavy type, in the radial direction ZZ', which encourages the sipes to close, as the tread enters the contact patch, with a self-locking effect. Each transverse groove 5 is delimited by two faces (51, 52) facing one another, each face (51, 52) intersecting the tread surface (21) along an edge corner (511, 521). In the case presented, the transverse grooves 5 have a rectilinear profile, in the radial direction ZZ', the width of which ensures that the groove 5 will not close, namely that its faces (511, 521) will not come into contact as the tread enters the contact patch.

FIG. 2A is a plan view of a tread 2 of a tire 1 according to a preferred embodiment of the circumferential grooves. The tread 2, intended to come into contact with the ground via a tread surface 21, has an axial width $W_T$ and a radial thickness $H_T$ (not depicted) at least equal to 70 mm. The tread 2, in the case depicted, comprises 5 circumferential grooves 3 positioned axially on each side of an equatorial plane XZ passing through the middle of the tread and perpendicular to the axis of rotation YY' of the tire. Each circumferential groove 3 is positioned axially, with respect to the equatorial plane XZ, at an axial distance L, and has an axial width W along the axis YY', and a radial depth H (not depicted) along the axis ZZ', the radial depth H being at least equal to 70% of the radial thickness $H_T$ and at most equal to the radial thickness $H_T$. According to this first embodiment of the invention, each circumferential groove 3 has an axial width W and a radial depth H, such that the ratio W/H is at least equal to 0.06, the axial distance C between two consecutive circumferential grooves 3 is at least equal to 12% and at most equal to 21% of the axial width $W_T$ of the tread, and each of the axially outermost circumferential grooves 3 is positioned axially, with respect to the equatorial plane XZ, at an axial distance $L_E$ at least equal to 25% of the axial width $W_T$ of the tread.

Figure 2B:
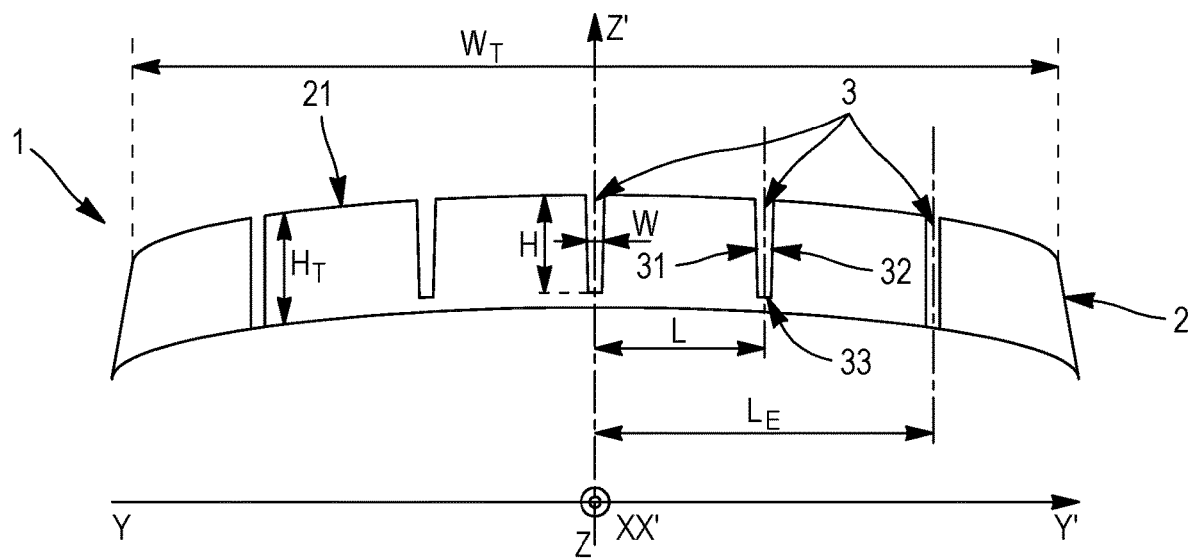
FIG. 2B: a view in meridian section, on a meridian plane YZ, of a tread of a tire according to one preferred embodiment of the circumferential grooves.

FIG. 2B is a view in meridian section, in a meridian plane YZ of a tread 2 of a tire 1 according to a preferred embodiment of the circumferential grooves. This FIG. 2B in particular depicts the circumferential grooves 3 in meridian section, namely 5 circumferential grooves in the case presented. In general, a circumferential groove 3 extends axially between two substantially circumferential faces (31, 32), radially toward the inside from the tread surface 21 as far as a bottom face 33 and circumferentially around the entire circumference of the tire. A circumferential groove 3, positioned axially with respect to the equatorial plane at an axial distance L, has an axial width W, measured between the two substantially circumferential faces (31, 32) and a radial depth H, measured between the tread surface 21 and the bottom face 33. The radial depth H of a circumferential groove 3 is at least equal to 70% and at most equal to 100% of the radial thickness $H_T$. The radial thickness $H_T$ of the tread 2 is defined as being the maximum radial depth measured in the cuts, namely, in this instance, between the tread surface 21 and the bottom face 33 of the axially outermost circumferential groove 3 which in this instance is the deepest cut. The radial thickness $H_T$ is at least equal to 70 mm.

FIG. 3A depicts a plan view of a tread of a tire according to a preferred embodiment of the transverse cuts, in which embodiment the tread 2 comprises a middle portion 22 having an axial width $W_C$ at least equal to 50% and at most equal to 80% of the axial width $W_T$, delimited axially by the two axially outermost circumferential grooves 3, and two lateral portions (23, 24) axially positioned respectively one on each side of the middle portion 22 and each having an axial width $W_S$ at least equal to 10% and at most equal to 25% of the axial width $W_T$. The tread 2 is such that the middle portion 22 comprises transverse sipes 4 opening into the circumferential grooves 3. As shown in FIG. 3B, in circumferential section CC, these transverse sipes 4 of the middle portion 22 have a radial depth H1 at least equal to 70% of the radial thickness $H_T$ and delimit elements in relief 6 of a height equal to the radial depth H1 of the said transverse sipes and of circumferential length B1 equal to the mean distance between two consecutive transverse sipes 4. For all the elements in relief 6 delimited by two consecutive transverse sipes 4 of the middle portion 22, the ratio H1/B1 is at least equal to 0.5 and at most equal to 2.5.

In the embodiment depicted in FIG. 3A, the tread 2 is such that each lateral portion (23, 24) comprises an alternation of transverse sipes 4 and transverse grooves 5 opening on one side into a circumferential groove 3 and on the other side into an axial end of the tread 2. As shown in FIG. 3C, in circumferential section BB, a transverse sipe 4 and a transverse groove 5 which are consecutive both have a radial depth H2 at least equal to 70% of the radial thickness $H_T$ and delimit an element in relief 6 of a height equal to the radial depth H2 of the said transverse sipe and groove (4, 5), and of circumferential length B2 equal to the mean distance between a transverse sipe 4 and a transverse groove 5 which are consecutive. For all the elements in relief 6 delimited by a transverse sipe 4 and a transverse groove 5 which are consecutive in each lateral portion (23, 24) the ratio H2/B2 is at least equal to 0.5 and at most equal to 2.5.

Figure 4A:
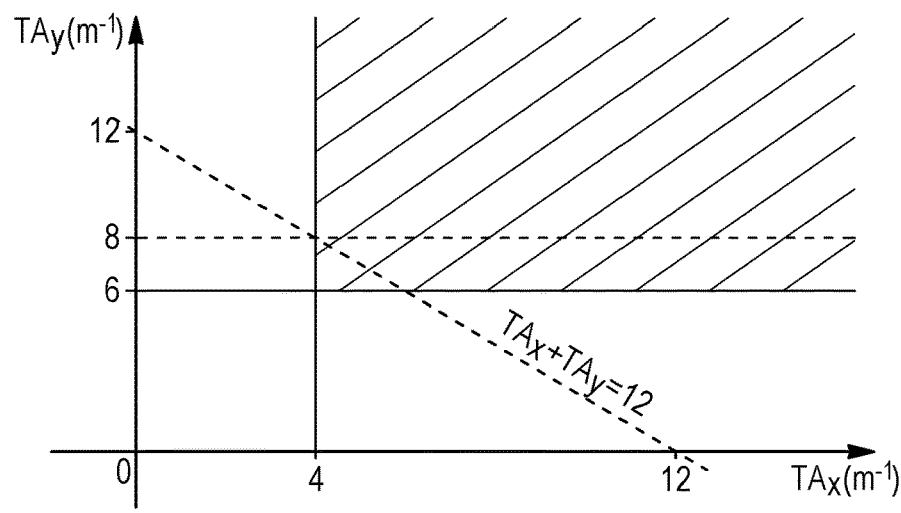
FIG. 4A: the range of the respectively longitudinal $TA_X$ and transverse $TA_Y$ edge corners ratios for a tread according to an embodiment of the invention.

FIG. 4A depicts the range of the longitudinal edge corners ratio $TA_X$ as a function of the transverse edge corners ratio $TA_Y$ for a tread according to the invention, characterized by a longitudinal edge corners ratio $TA_X$ at least equal to 4 m$^{-1}$ and a transverse edge corners ratio $TA_Y$ at least equal to 6 m$^{-1}$. According to a first preferred embodiment, the transverse edge corners ratio $TA_Y$ is at least equal to 8 m$^{-1}$, preferably at least equal to 10 m$^{-1}$. According to a second preferred embodiment, the sum of the longitudinal edge corners ratio $TA_X$ and of the transverse edge corners ratio $TA_Y$ is at least equal to 12 m$^{-1}$.

Figure 4B:
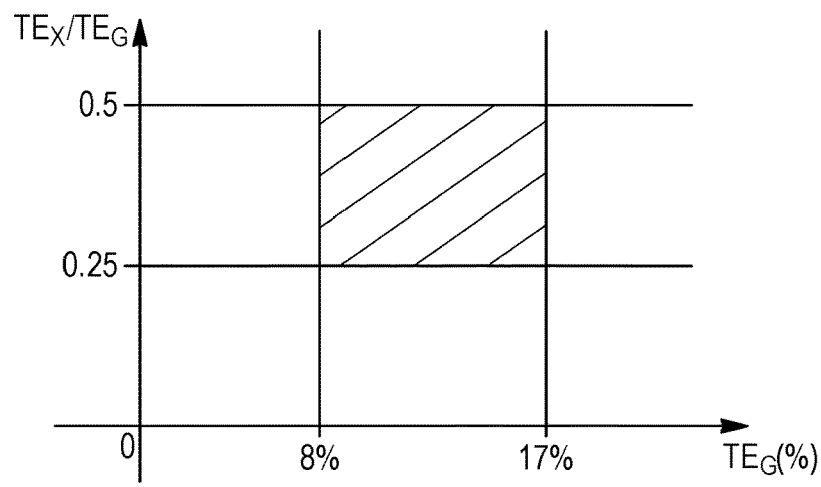
FIG. 4B: the range of the respectively longitudinal $TE_X$ and transverse $TE_Y$ volume voids ratios for a tread according to an embodiment of the invention.

FIG. 4B depicts the range of the ratio between the longitudinal voids ratio $TE_X$ and the overall volume voids ratio $TE_G$ as a function of the overall volume voids ratio $TE_G$, for a tire I according to the invention and for 3 tires R1, R2 and R3 of the prior art taken as reference. A tread according to the invention is characterized by a longitudinal volume voids ratio $TE_X$ is at least equal to 0.25 times and at most equal to 0.50 times the overall volume voids ratio $TE_G$ and an overall volume voids ratio $TE_G$ at least equal to 8% and at most equal to 15%. Remember that the overall volume voids ratio $TE_G$ is the sum of the longitudinal volume voids ratio $TE_X$ for the circumferential direction XX, and of the transverse volume voids ratio $TE_Y$ for the axial direction YY'.

Figure 4C:
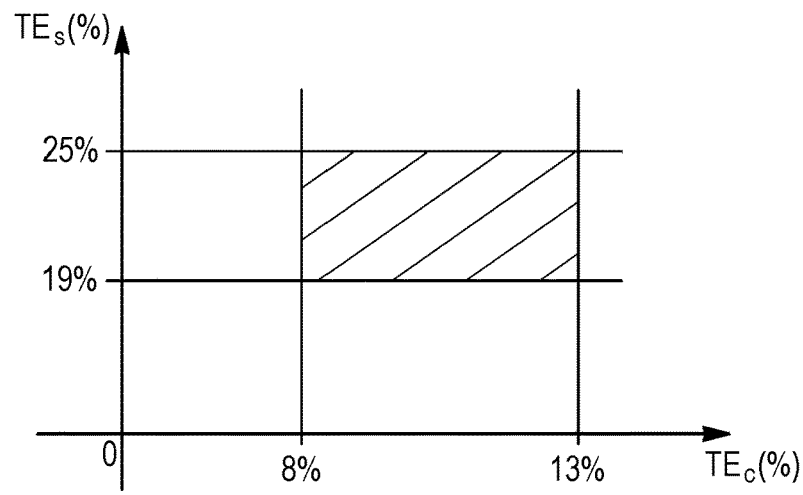
FIG. 4C: the range of the respectively middle $TE_C$ and lateral $TE_S$ volume voids ratios for a tread according to an embodiment of the invention.

FIG. 4C depicts the range of the middle volume voids ratio $TE_C$ as a function of the lateral volume voids ratio $TE_S$ for a tread according to the invention, characterized by a middle volume voids ratio $TE_C$ at least equal to 8% and at most equal to 13% and a lateral volume voids ratio $TE_S$ at least equal to 19% and at most equal to 25%.

The inventors have studied this invention more particularly in the case of a dumper tire of size 40.00R57 and 59/80R63.

The characteristics of the tread for these tires according to the invention and for a tire of the prior art taken as reference, are presented in Table 1 below:

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

TABLE 1

| | Tire size | | |
|---|---|---|---|
| | 40.00R57 XDR2 Michelin (Reference) | 40.00R57 | 59/ 80R63 |
| Axial width $W_T$ (mm) | 1000 | 1000 | 1200 |
| Radial thickness $H_T$ (mm) | 102 | 108 | 70 |
| Width of middle zone $W_C$ (mm) | 600 | 725 | 883 |
| Longitudinal edge corners ratio $TA_X$ (m$^{-1}$) | 3.9 | 6.6 | 4.2 |
| Transverse edge corners ratio $TA_Y$ (m$^{-1}$) | 2.9 | 13.5 | 8.9 |
| Overall volume voids ratio $TE_G$ (%) | 19.5 | 13 | 14.8 |
| Longitudinal volume voids ratio $TE_X$ (%) | 2.9 | 4.2 | 4.6 |
| Transverse volume voids ratio $TE_Y$ (%) | 16.6 | 8.8 | 10.2 |

TABLE 1-continued

| | Tire size | | |
|---|---|---|---|
| | 40.00R57 XDR2 Michelin (Reference) | 40.00R57 | 59/ 80R63 |
| Middle volume voids ratio $TE_C$ (%) | 15.6 | 10 | 11.8 |
| Lateral volume voids ratio $TE_S$ (%) | 25.5 | 21 | 23.6 |

The invention claimed is:

1. A tire for a heavy-duty vehicle of civil engineering type comprising a tread, adapted to come into contact with the ground via a tread surface:

the tread having an axial width $W_T$ and a radial thickness $H_T$ at least equal to 70 mm, the tread comprising cuts distributed, in a circumferential direction of the tire, among circumferential grooves and, in an axial direction of the tire, transverse sipes and transverse grooves, wherein the transverse grooves have a constant circumferential width across their axial length, wherein the entire axial length of each transverse groove having the constant circumferential width is defined between a respective circumferential groove and an axial end of the axial width $W_T$, the cuts delimiting elements in relief, each cut being delimited by two faces facing one another and each said face the tread surface along an edge corner, wherein the two faces forming each respective transverse groove are planar, the tread having a longitudinal edge corners ratio $TA_X$ and a transverse edge corners ratio $TA_Y$, the longitudinal edge corners ratio $TA_X$ being equal to the ratio $L_X/S$ between the sum $L_X$ of the projections, onto the circumferential direction, of the effective edge corner lengths, contained in an elementary tread surface portion of surface area S, and the surface area S, the transverse edge corners ratio $TA_Y$ being equal to the ratio $L_Y/S$ between the sum $L_Y$ of the projections, onto the axial direction, of the effective edge corner lengths, contained in an elementary tread surface portion of surface area S, and the surface area S, wherein the longitudinal edge corners ratio $TA_X$ is at least equal to 4 $m^{-1}$ and in that the transverse edge corners ratio $TA_Y$ is at least equal to 8 $m^{-1}$.

2. The tire for a heavy-duty vehicle of civil engineering type according to claim 1, wherein the sum of the longitudinal edge corners ratio $TA_X$ and of the transverse edge corners ratio $TA_Y$ is at least equal to 12 $m^{-1}$.

3. The tire for a heavy-duty vehicle of civil engineering type according to claim 1:

the tread having an overall volume voids ratio $TE_G$ equal to the ratio between the total volume $V_D$ of the cuts and the sum of the total volume $V_D$ of the cuts and of the total volume $V_R$ of the elements in relief which are delimited by these cuts, the overall volume voids ratio $TE_G$ being equal to the sum of a longitudinal volume voids ratio $TE_X$ and of a transverse volume voids ratio $TE_Y$, the longitudinal volume voids ratio $TE_X$ being equal to the ratio between the total volume $V_{DX}$ of the longitudinal cuts, of circumferential groove type, and the sum of the total volume $V_D$ of the cuts and of the total volume $V_R$ of the elements in relief delimited by these cuts, the transverse volume voids ratio $TE_Y$ being equal to the ratio between the total volume $V_{DY}$ of the transverse cuts, of sipe and groove type, and the sum of the total volume $V_D$ of the cuts and of the total volume $V_R$ of the elements in relief delimited by these cuts, wherein the overall volume voids ratio $TE_G$ is at least equal to 8% and at most equal to 17%, wherein the longitudinal volume voids ratio $TE_X$ is at least equal to 0.25 times and at most equal to 0.50 times the overall volume voids ratio $TE_G$ and wherein the transverse volume voids ratio $TE_Y$ is at least equal to 0.50 times and at most equal to 0.75 times the overall volume voids ratio $TE_G$.

4. The tire for a heavy-duty vehicle of civil engineering type according to claim 1:

the tread comprising a middle part having an axial width Wc at least equal to 50% and at most equal to 80% of the axial width $W_T$, and two lateral portions, respectively positioned axially on either side of the middle part, and each having an axial width $W_S$ at least equal to 10% and at most equal to 25% of the axial width $W_T$, the middle portion and each lateral portion having a middle volume voids ratio $TE_C$ and a lateral volume voids ratio $TE_S$, respectively, the middle volume voids ratio $TE_C$ being equal to the ratio between the total volume $V_{DC}$ of the cuts in the middle portion and the sum of the total volume $V_D C$ of the cuts in the middle portion and of the total volume $V_{RC}$ of the elements in relief of the middle portion which are delimited by these cuts, the lateral volume voids ratio $TE_S$ being equal to the ratio between the total volume $V_{DS}$ of the cuts in the lateral portion and the sum of the total volume $V_D S$ of the cuts in the lateral portion and of the total volume $V_{RS}$ of the elements in relief of the lateral portion which are delimited by these cuts, wherein the middle volume voids ratio $TE_C$ is at least equal to 8% and at most equal to 13% and wherein the lateral volume voids ratio $TE_S$ is at least equal to 19% and at most equal to 25%.

5. The tire for a heavy-duty vehicle of civil engineering type according to claim 1:

the tread comprising at least two circumferential grooves, positioned axially one on each side of an equatorial plane passing through the middle of the tread and perpendicular to the axis of rotation of the tire, each circumferential groove extending axially between two substantially circumferential faces, radially towards the inside from the tread surface as far as a bottom face and circumferentially around the entire circumference of the tire, each circumferential groove being axially positioned with respect to the equatorial plane at an axial distance L, having an axial width W, measured between the two substantially circumferential faces, and a radial depth H, measured between the tread surface and the bottom face, the radial depth H being at least equal to 70% of the radial thickness $H_T$ and at most equal to the radial thickness $H_T$, wherein each circumferential groove has an axial width W and a radial depth H, such that the ratio W/H is at least equal to 0.06, wherein the axial distance C between two consecutive circumferential grooves is at least equal to 12% and at most equal to 21% of the axial width $W_T$ of the tread, and wherein each of the axially outermost circumferential grooves is positioned axially, with respect to the equatorial plane, at an axial distance $L_E$ at least equal to 25% of the axial width $W_T$ of the tread.

6. The tire for a heavy-duty vehicle of civil engineering type according to claim 5, wherein the ratio W/H is at most equal to 0.15.

7. The tire for a heavy-duty vehicle of civil engineering type according to claim 5, wherein the axial distance $L_E$ is at least equal to 30%, of the axial width $W_T$ of the tread.

8. The tire for a heavy-duty vehicle of civil engineering type according to claim 5, wherein the axial distance $L_E$ is at most equal to 40% of the axial width $W_T$ of the tread.

9. The tire for a heavy-duty vehicle of civil engineering type according to claim 5, wherein the axial distance C between two consecutive circumferential grooves is at least equal to 150% and at most equal to 200% of the radial thickness $H_T$.

10. The tire for a heavy-duty vehicle of civil engineering type according to claim 1, wherein—the tread comprises at least four circumferential grooves.

11. The tire for a heavy-duty vehicle of civil engineering type according to claim 1, wherein the tread comprises at most eight circumferential grooves.

12. The tire for a heavy-duty vehicle of civil engineering type according to claim 1,
the tread comprising a middle part having an axial width $W_C$ at least equal to 50% and at most equal to 80% of the axial width $W_T$, and two lateral portions, respectively positioned axially on either side of the middle part, and each having an axial width $W_S$ at least equal to 10% and at most equal to 25% of the total axial $W_T$,
the tread being such that the middle portion comprises transverse sipes opening into the circumferential grooves,
said transverse sipes having a radial depth H1 at least equal to 70% of the radial thickness $H_T$ and delimiting elements in relief of a height equal to the radial depth H1 of the said transverse sipes and of circumferential length B1 equal to the mean distance between two consecutive transverse sipes,
wherein for all the elements in relief delimited by two consecutive transverse sipes of the middle portion, the ratio H1/B1 is at least equal to 0.5 and at most equal to 2.5.

13. The tire for a heavy-duty vehicle of civil engineering type according to claim 1,
the tread comprising a middle part having an axial width $W_C$ at least equal to 50% and at most equal to 80% of the axial width $W_T$, and two lateral portions, respectively positioned axially on either side of the middle part, and each having an axial width $W_S$ at least equal to 10% and at most equal to 25% of the axial width $W_T$,
the tread being such that at least a lateral portion comprises transverse cuts, of transverse sipe or transverse groove type, opening on one side into a circumferential groove and on the other side into an axial end of the tread,
these transverse cuts having a radial depth H2 at least equal to 70% of the radial thickness $H_T$ and delimiting elements in relief of a height equal to the radial depth H2 of said transverse cuts and of circumferential length B2 equal to the mean distance between two consecutive transverse cuts,
wherein, for all the elements in relief delimited by two consecutive transverse cuts of at least one lateral portion, the ratio H2/B2 is at least equal to 0.5 and at most equal to 2.5.

14. The tire for a heavy-duty vehicle of civil engineering type according to claim 13, wherein at least one lateral portion comprises an alternation of said transverse sipes and of said transverse grooves such that any element in relief is delimited by a transverse sipe and a transverse groove which are consecutive.

15. The tire for a heavy-duty vehicle of civil engineering type according to claim 1, wherein facing walls of the transverse sipes extend radially in a non-linear manner.

16. The tire for a heavy-duty vehicle of civil engineering type according to claim 15, wherein the facing walls of the transverse sipes extend radially in a zig-zag pattern.

17. The tire for a heavy-duty vehicle of civil engineering type according to claim 1, wherein each transverse groove forms an angle of at least equal to 45° with the circumferential direction.

18. The tire for a heavy-duty vehicle of civil engineering type according to claim 1, wherein the transverse sipes have a constant circumferential width across their axial length, and wherein the axial length of each transverse sipe is measured between two respective circumferential grooves.

19. A tire for a heavy-duty vehicle of civil engineering type comprising a tread, adapted to come into contact with the ground via a tread surface:
the tread having an axial width $W_T$ and a radial thickness $H_T$ at least equal to 70 mm,
the tread comprising cuts distributed, in a circumferential direction of the tire, among circumferential grooves and, in an axial direction of the tire, transverse sipes and transverse grooves, wherein the transverse grooves have a constant circumferential width across their axial length,
the cuts delimiting elements in relief,
each cut being delimited by two faces facing one another and each said face the tread surface along an edge corner, wherein the two faces forming each respective transverse groove are planar,
the tread having a longitudinal edge corners ratio $TA_X$ and a transverse edge corners ratio $TA_Y$,
the longitudinal edge corners ratio $TA_X$ being equal to the ratio $L_X/S$ between the sum $L_X$ of the projections, onto the circumferential direction, of the effective edge corner lengths, contained in an elementary tread surface portion of surface area S, and the surface area S,
the transverse edge corners ratio $TA_Y$ being equal to the ratio $L_Y/S$ between the sum $L_Y$ of the projections, onto the axial direction, of the effective edge corner lengths, contained in an elementary tread surface portion of surface area S, and the surface area S,
wherein at least one of:
the longitudinal edge corners ratio $TA_X$ is at least equal to 8 $m^{-1}$ and
the sum of the longitudinal edge corners ratio $TA_X$ and of the transverse edge corners ratio $TA_Y$ is at least equal to 12 $m^{-1}$.

* * * * *